(12) United States Patent
Mayeur et al.

(10) Patent No.: US 9,062,258 B2
(45) Date of Patent: Jun. 23, 2015

(54) PROCESS FOR HYDROTREATING A DIESEL FUEL FEEDSTOCK, HYDROTREATING UNIT FOR THE IMPLEMENTATION OF THE SAID PROCESS, AND CORRESPONDING HYDROREFINING UNIT

(75) Inventors: Vincent Mayeur, Notre Dame de Gravenchon (FR); Cesar Vergel, Maneglise (FR); Gildas Morvan, Fontenay (FR); Laurent Mariette, Deauville (FR); Michael Hecquet, Le Havre (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 1173 days.

(21) Appl. No.: 12/377,790

(22) PCT Filed: Dec. 11, 2007

(86) PCT No.: PCT/FR2007/002034
§ 371 (c)(1), (2), (4) Date: Feb. 17, 2009

(87) PCT Pub. No.: WO2008/087279
PCT Pub. Date: Jul. 24, 2008

(65) Prior Publication Data
US 2011/0047862 A1     Mar. 3, 2011

(30) Foreign Application Priority Data
Dec. 18, 2006 (FR) ..................................... 06 11028

(51) Int. Cl.
*C10G 65/04* (2006.01)
*C10G 65/10* (2006.01)
(Continued)

(52) U.S. Cl.
CPC .............. *C10G 3/50* (2013.01); *C10G 2400/04* (2013.01); *C10G 3/46* (2013.01); *C10G 3/47* (2013.01);
(Continued)

(58) Field of Classification Search
CPC ........ C10G 65/04; C10G 65/10; C10G 45/02; C10G 45/08
USPC .............. 44/307, 389; 208/59, 78, 80, 88, 89, 208/143, 229; 422/187, 190, 196; 585/14, 585/240, 300, 302
See application file for complete search history.

(56) References Cited

U.S. PATENT DOCUMENTS

| 3,248,316 A | 4/1966 | Barger, Jr. et al. |
| 3,793,190 A | 2/1974 | Nastast et al. |

(Continued)

FOREIGN PATENT DOCUMENTS

| EP | 1 396 531 A2 | 3/2004 |
| EP | 1 693 432 A1 | 8/2006 |

OTHER PUBLICATIONS
International Search Report for PCT/FR2007/002034.

*Primary Examiner* — Randy Boyer
(74) *Attorney, Agent, or Firm* — Sughrue Mion, PLLC

(57) ABSTRACT

The invention relates to a process for the catalytic hydrotreating of a feedstock of petroleum origin of diesel fuel type and of a feedstock of biological origin based on vegetable oils and/or animal fats in a stationary bed catalytic hydrotreating unit, the said process being characterized in that the feedstock of petroleum origin is introduced into the said reactor upstream of the feedstock of biological origin.
It also relates to a catalytic hydrotreating unit for the implementation of the said process and to a corresponding hydrorefining unit.

46 Claims, 3 Drawing Sheets

(51) Int. Cl.
*C10G 45/02* (2006.01)
*C10G 45/08* (2006.01)
*C10G 3/00* (2006.01)
*C10G 45/10* (2006.01)
*C10G 45/12* (2006.01)

(52) U.S. Cl.
CPC .. *C10G 3/49* (2013.01); *C10G 3/54* (2013.01); *C10G 3/60* (2013.01); *C10G 2300/1014* (2013.01); *C10G 2300/1018* (2013.01); *C10G 2300/1022* (2013.01); *C10G 2300/1048* (2013.01); *C10G 2300/405* (2013.01); *C10G 2300/805* (2013.01); *C10G 45/08* (2013.01); *C10G 45/10* (2013.01); *C10G 45/12* (2013.01)

(56) References Cited

U.S. PATENT DOCUMENTS

| | | | |
|---|---|---|---|
| 4,016,070 A | | 4/1977 | Christman et al. |
| 4,929,781 A | | 5/1990 | James, Jr. et al. |
| 5,114,562 A | * | 5/1992 | Haun et al. ............ 208/89 |
| 5,435,836 A | * | 7/1995 | Anand et al. ............ 95/45 |
| 5,958,218 A | * | 9/1999 | Hunter et al. ............ 208/78 |
| 6,793,804 B1 | | 9/2004 | Lindsay et al. |
| 7,781,629 B2 | * | 8/2010 | Marchand et al. ......... 208/113 |
| 8,551,327 B2 | * | 10/2013 | Lewis et al. ............ 208/89 |
| 8,686,204 B2 | * | 4/2014 | Bozzano et al. ......... 208/89 |

\* cited by examiner

PROCESS FOR HYDROTREATING A DIESEL FUEL FEEDSTOCK, HYDROTREATING UNIT FOR THE IMPLEMENTATION OF THE SAID PROCESS, AND CORRESPONDING HYDROREFINING UNIT

The invention relates to a process for hydrotreating a diesel fuel feedstock, to a hydrotreating unit for the implementation of the said process, and to a corresponding hydrorefining unit.

Due to the increasing strictness of pollution control standards for diesel engines, the specifications for diesel engine fuels have changed during the last two decades and new constraints have appeared which have resulted in a modification of the formulations of diesel engine fuel mixtures.

Since January 2005, the specifications for diesel engine fuels have been as follows: (European Standard EN590):

Density (at 15° C.): 820-845 kg/m$^3$
T95% (Distillation temperature for 95% of the diesel fuel): 360° C. (maximum)
Sulphur content: 50 mg/kg (maximum)
Engine cetane number: 51 (minimum)
Calculated cetane index (ASTM D4737): 46 (minimum)
Cloud point: <−5° C. in winter,
<+5° C. in summer.

The desired bases are thus light sulphur-free bases with a high cetane index which distil completely before 360° C.

The objectives are to further reduce the sulphur content to a value of less than 10 mg/kg by 2009 and to increase the minimum value of the engine cetane number.

One solution for improving the cetane index consists in adding a cetane number improver. These are generally alkyl nitrates, which intervene in the basic oxidation stages before the self-ignition of the mixture. They thus reduce the ignition delay and make it possible to increase the cetane index by 3 to 5 points, depending on the amount added. However, they decrease in effectiveness as the starting cetane index decreases.

Another solution consists in adding a substitute fuel to the mixture, such as a biofuel, as esters of vegetable oils generally exhibit a good cetane index.

For this reason, European Directive 2003/30/EC is targeted in particular at promoting the use of biofuels. In transportation, the European Community has adopted an objective of a portion of biofuels of 5.75% of the NCV (Net Calorific Value) of fuels in 2010, that is to say that the amount of biofuel present in the mixture should provide 5.75% of the NCV of the mixture.

Currently, the French Government has introduced a tax: the TGAP (Taxe Générale des Activités Polluantes) [General Tax on Polluting Activities], which relates to fuels consumed on French territory. The fuels subject to this tax are "SP95", "SP98" and "Diesel Engine Fuel". The objective of this tax is to encourage the incorporation of biofuel by gradually increasing the percentage of the NCV (Net Calorific Value) contributed by the proportion of biofuel from 1.75% in 2006 to 7.00% in 2010.

This addition is carried out on the basis of the energy and the "bio" origin of the products incorporated. Thus, the level of ETBE (ethyl tert-butyl ether) is reduced since it comprises only 47% of ethanol (of agricultural origin) and a lower NCV than petrol.

For diesel engine fuels, the most commonly used biofuels are vegetable oil esters, such as rapeseed oil methyl ester (RME).

These diesel engine fuels are generally obtained by mixing the biofuel with the diesel engine fuel after treatment of the latter. These mixtures are thus often produced by the distributors, immediately before distributing the fuel.

The mixtures obtained from vegetable oil methyl esters exhibit the advantage of a cetane number in accordance with the standard but their density (greater than 880 kg/m$^3$) is much greater than the specification of the standard, which causes formulation difficulties at high levels of incorporation. Vegetable oil ether esters also result in excessively heavy mixtures, without forgetting the problem of stability over time.

Processes for refining the biomass which have been developed for producing these biofuels are already known. Thus, the documents U.S. Pat. Nos. 4,992,605, 5,705,722, EP 1 396 531 and SE 520 633 describe processes for hydrotreating triglycerides present in vegetable oils. However, the reactions employed are highly exothermic. In order to limit the problems related to this high exothermicity, it is necessary to recirculate up to 80% of the feedstock at the outlet of the hydrotreating reactor to the inlet of the latter, hence the need to produce a new plant dedicated to this hydrotreating process and to hydraulically oversize this unit with respect to the amount of the feedstock actually treated.

Furthermore, Patent Application EP 1 693 432 describes a process for hydrotreating a mixture of a feedstock of petroleum origin and of a feedstock of biological origin. Nevertheless, as the reactions for the hydrodeoxygenating of the triglycerides are faster than those for the hydrorefining of the petroleum fractions, the treatment of such a mixture of feedstocks of petroleum and biological origin at the top of the reactor results in a fall in the hydrogen partial pressure and thus a fall in the catalytic activity in hydrotreating the petroleum feedstock. Furthermore, parallel reactions during the hydrorefining of the triglycerides result in the production of gases, such as carbon dioxide $CO_2$, methane $CH_4$ and carbon monoxide CO, which is regarded as a reversible inhibitor of the desulphurizing activity of the catalyst. In point of fact, in a conventional hydrotreating unit, these gases, which comprise hydrogen $H_2$ (recycle gas), are generally separated from the effluent exiting from the reactor and then reinjected into the reactor after passing through a treatment system. The presence of CO in the recycle gas thus proves to be damaging to the reactions for the hydrorefining of the petroleum fraction.

The Applicant Company has proposed, in its French Patent Application 06.06892, a process for the hydrotreating of a mixture of a feedstock of petroleum origin of diesel fuel type and of a feedstock of biological origin of the vegetable oils and/or animal fats type, without a device for recycling liquid effluent at the top of the reactor. This mixture is introduced at the top of the reactor, in the manner of a conventional feedstock. The process described in this patent application, in one of its alternative forms, comprises a unit for the separation and treatment of the carbon monoxide present in the recycle gases.

Nevertheless, there exists still a need in the industry to improve the performance of the process for hydrotreating a mixture of a feedstock of petroleum origin and of a feedstock of biological origin, while limiting the formation of gases of the $CH_4$ type, and also $H_2O$.

In particular, when triglycerides are added in a diesel fuel feedstock, it is necessary to increase the amount of hydrogen $H_2$ supplied in order to cover an increased consumption of $H_2$ and to increase the temperature of the reaction, or the volume of catalyst, if it is desired to maintain the same hydrodesulphurization (HDS) activity, that is to say if it is desired to achieve the same level of sulphur at the outlet in comparison with a conventional HDS.

However, a higher reaction temperature results in a reduction in the duration of a cycle, so that it is preferable to be able to reduce this temperature in order to increase this duration. It is also preferable to limit the consumption of $H_2$ for economic reasons.

To this end, the invention provides a process for the catalytic hydrotreating of a feedstock of petroleum origin of diesel fuel type and of a feedstock of biological origin based on vegetable oils and/or animal fats in a stationary bed hydrotreating unit, the said process being characterized in that the feedstock of petroleum origin is introduced into the said unit upstream of the feedstock of biological origin.

To this end, another subject-matter of the invention is a hydrotreating unit for the implementation of the said process, and a corresponding hydrorefining unit.

Within the meaning of the present invention, the term "feedstock of biological origin" is understood to mean any renewable feedstock commonly defined by the term "biomass".

Due to its introduction upstream of the feedstock of biological origin, the treatment of the feedstock of petroleum origin is not disturbed by the treatment of the feedstock of biological origin. It is then possible to carry out the reactions for hydrorefining the petroleum fraction under more favourable conditions in comparison with a joint introduction of the two types of feedstocks.

This is because the hydrodesulphurization of the feedstock of petroleum origin is not disturbed by the introduction of the feedstock of biological origin which takes place downstream. Thus, the hydrodeoxygenation of the feedstock of biological origin takes place downstream of the hydrodesulphurization of the petroleum fraction, so that the hydrodesulphurization can be carried out without the inhibiting effect of the CO and of the other gases formed during the reaction for the hydrodeoxygenating of the triglycerides of the feedstock of biological origin and so that the hydrogen partial pressure will not be lowered by the reaction for the hydrorefining of the feedstock of biological origin, which makes it possible to maintain a high hydrodesulphurization catalytic activity.

The downstream introduction of the feedstock of biological origin also makes it possible to carry out the hydrodeoxygenating of the latter under more favourable conditions (lower hydrogen partial pressure, lower temperature and the like) which limit the formation of $CH_4$ and $H_2O$, which reduces the $H_2$ consumption and the exthermocity of the reaction.

This is because the cracking reactions which occur during the deoxygenation of the feedstock of biological origin (by decarbonylation and/or decarboxylation) result in the detachment of a carbon at the chain end, which will bring about a thermodynamic equilibrium between $CO/CO_2/CH_4$ by the CO shift reaction ($CO+H_2O \longleftrightarrow CO_2+H_2$) and the reactions for the methanation of CO ($CO+3H_2 \longleftrightarrow CH_4+H_2O$) and of $CO_2$ ($CO_2+4H_2 \longleftrightarrow CH_4+2H_2O$).

Moreover, the $CO/CO_2$ ratio is always under the control of the equilibrium constant of the CO shift reaction.

Thus, a reduction in the concentration of CO, the inhibiting effect of which is a problem, in favour of the concentration of $CO_2$, which can be more easily removed, for example by washing with amines, is obtained by:

the decrease in the $H_2$ partial pressure, obtained according to the invention in that a large proportion of the hydrogen is consumed by the hydrotreating of the diesel fuel feedstock upstream of the section for the hydrodeoxygenating of the feedstock of biological origin, a shorter residence time of the feedstock of biological origin, obtained according to the invention in that it is possible to reduce the volume of catalyst downstream of the region for injection of the biological feedstock, a treatment of the feedstock of biological origin at the lowest possible temperature, which can be obtained in an alternative form of the invention described later, the addition of water, which can be obtained in another alternative form of the invention described later, the removal of the carbon monoxide from the recycle gas of the unit, as described later.

Another advantage of the process according to the invention is the dilution of the feedstock of biological origin by the partially hydrotreated feedstock of petroleum origin resulting from the introduction of the feedstock of biological origin downstream of the feedstock of petroleum origin in the hydrotreating unit.

This is because the hydrotreating of the feedstocks of biological origin based on vegetable and/or animal oils is highly exothermic and requires a means of control of the reaction temperature, such as the use of a large dilution volume. For this reason, to date, these vegetable and/or animal oils were treated in dedicated units with high recycling of liquid effluent.

It is thus possible to limit, indeed even to eliminate, the recycling of liquid effluent by using the process according to the invention in comparison with the known processes for refining a feedstock of biological origin alone.

The process according to the invention also makes it possible:

to minimize the formation of methane ($CH_4$)

to improve the properties of the diesel fuel produced: cetane number, density, distillation, and the like, to increase the volume of diesel fuel produced with the same feedstock of petroleum origin, which perfectly meets current requirements in Europe, where there is a lack of diesel fuel.

The process according to the invention furthermore makes it possible to use different catalysts in each of the catalytic regions where the feedstocks of petroleum and biological origin are injected: for example CoMo for the region for hydrorefining the petroleum fraction and preferably NiMo for the second region where the triglycerides are treated.

In a first alternative form of the process according to the invention, the hydrotreating unit is formed of a single reactor into which the feedstocks of petroleum and biological origin are injected.

This alternative form exhibits the advantage of making possible the use of an existing hydrotreating unit to which will have been added an inlet for the feedstock of biological origin.

In a second alternative form, the hydrotreating unit is formed of two separate reactors, the feedstock of petroleum origin being injected into the first reactor and the feedstock of biological origin being injected into the second reactor as a mixture with the liquid effluent exiting from the first reactor.

This alternative form exhibits the advantage of making possible the treatment of the feedstock of biological origin at a lower temperature than the temperature for treatment of the feedstock of petroleum origin. This is because the hydrotreating of the feedstock of biological origin can take place at a lower temperature so that it is not necessary to heat the feedstock a great detail in order to treat it. Moreover, most of the hydrotreating of the feedstock of petroleum origin has already taken place in the first reactor; the second reactor then makes possible the hydrofinishing of the treatment of the feedstock of petroleum origin and does not require temperatures which are so high. This hydrofinishing makes it possible to obtain a much lower sulphur content in comparison with the contents usually obtained in hydrorefining.

Moreover, generally, reactions for the recombination of olefins with $H_2S$, which are favoured at high temperature, are the cause of the formation of mercaptans and make it difficult to obtain diesel fuels with a very low sulphur content. In point of fact, treatment conditions at a lower reaction temperature in the second reactor are favourable to the minimizing of these recombination reactions, which makes it possible to obtain a product with a very low sulphur content (<3 ppm) or to reduce the harshness of the conditions in the first reactor for a given target for sulphur produced.

This lower temperature in the second reactor also makes it possible to improve the thermal stability of the feedstock of biological origin, in particular when the liquid effluent exiting from the first reactor is cooled prior to being mixed with the feedstock of biological origin. It is possible in particular to recover the heat from this effluent and to thus lower the temperature of the latter in order to heat the feedstock of petroleum origin, and if appropriate the feedstock of biological origin, before they enter their respective reactors.

The exothermicity of the reaction for hydrotreating the feedstock of biological origin additionally requires a large dilution volume which is provided by the partially hydrotreated feedstock of petroleum origin exiting from the first reactor.

The lowering of the temperature of the second reactor also favours a reduction in the production of CO (see above).

Finally, to carry out the hydrodesulphurization reactions and the hydrodeoxygenating reactions in two separate reactors makes possible independent management of the catalysts in each of the reactors and makes possible the production of biomass-free diesel fuels. It is possible, for this, either to isolate the second reactor, in order to use only the first reactor, or to stop the feeding with vegetable oils and/or animal fats and use the two reactors for the hydrotreating of the diesel fuel feedstock.

In a third alternative form of the process according to the invention, the hydrotreating unit is formed of two separate reactors. The feedstock of petroleum origin is injected into the first reactor and the feedstock of biological origin is injected partly into the first reactor and partly into the second reactor, and the liquid effluent exiting from the first reactor is injected into the second reactor.

Advantageously, the space velocity (HSV) of the feedstock of petroleum origin is less than the space velocity of the feedstock of biological origin, as a mixture with the effluent resulting from the treatment of the feedstock of petroleum origin.

Under the conditions of the process (P, T°), the formation of $CH_4$ and $H_2O$ is thus slowed down because the reactions are limited kinetically (see the CO shift and methanation reactions described above). This results in a lower consumption of $H_2$ and in the production of a recycle gas which is more concentrated in hydrogen.

Advantageously, the feedstock of petroleum origin of diesel fuel type is chosen from the diesel fuel fractions originating from the distillation of a crude oil and/or of a synthetic crude resulting from the treatment of oil shales or of heavy and extraheavy crude oils or of the effluent from the Fischer-Tropsch process, the diesel fuel fractions resulting from various conversion processes, in particular those resulting from catalytic and/or thermal cracking (FCC, coking, visbreaking, and the like).

In particular, the feedstock of biological origin based on vegetable oils and/or animal fats is introduced up to a level of 30% by weight.

More particularly, the level of feedstock of biological origin based on vegetable oils and/or animal fats is preferably less than or equal to 15% by weight. This is because the introduction of such a level of feedstock of biological origin only very slightly affects the low-temperature properties of the final product. In particular, the cloud point of the final effluent generally exhibits only a difference of 1° C. with respect to the effluent obtained without injection of biomass. This result, which differs from that which the laws of mixtures would have predicted, is highly advantageous as it demonstrates the synergy, during the process according to the invention, between the two types of feedstocks.

The introduction of high levels of feedstock of biological origin is made possible by virtue of the use of the hydrotreated feedstock of petroleum origin as diluent, without the need for recirculation of liquid effluent upstream of the introduction of the feedstock of biological origin.

The vegetable or animal oils present in the feedstock of biological origin used according to the invention are composed predominantly of fatty acid triglycerides (>90% by weight), the chain lengths of which depend on the nature of the oil used. They can also comprise fatty acids. Within the meaning of the invention, the vegetable oils and animal fats can also comprise fatty acid esters.

In the context of the invention, the vegetable oils and animal fats can be used crude. However, they are preferably refined in order to prevent fouling of the hydrotreating unit. In this case, the term "degummed oils" is used, that is to say after withdrawal of a large portion of the phospholipids.

Advantageously, the catalytic region for injection of the feedstock of biological origin comprises a first metal trap catalytic bed known per se. These metal traps are generally composed of macroporous alumina. The purpose of using such a commercially known metal trap is to free the vegetable oils and/or animal fats from the impurities which they might contain (Na, K, Cl and the like).

The vegetable oils can in particular be palm oil, soybean oil, rapeseed oil, sunflower oil, linseed oil, rice bran oil, maize oil, olive oil, castor oil, sesame oil, pine oil, peanut oil, palm kernel oil, coconut oil, babasu oil or a mixture of two or more of these oils. These oils will essentially produce $C_{12}$ to $C_{18}$ paraffins.

Palm oil is particularly preferred as this is one of the oils comprising the shortest carbon chains, with close to 50% of $C_{16}$ chains. As palm oil is one of the most saturated oils, its hydrotreating requires a lower amount of hydrogen in comparison with the other oils. Furthermore, the thermal stability of palm oil limits the fouling of the heat exchangers situated upstream of the reactor in a conventional hydrorefining unit.

Palm oil additionally gives the advantage of having its profile centred on that of the diesel fuel feedstock, which limits the disruption to the latter, while being economic and of not being used to any great extent in the human diet.

Use may be made, as animal fats, for example, of fish fat, of animal oil (known as tall oil).

A particularly advantageous way of using the invention is thus to preferably use palm oil or any other vegetable oil or oil of animal origin capable of producing, by hydrotreating, a maximum of $C_{15}$ to $C_{18}$ paraffins, so as to bring about a large increase in the cetane index of the feedstocks produced while reducing as much as possible the density and to better enhance in value the bases with a low cetane index and a high density, such as LCO (Light Cycle Oil), which is characterized by a high density and a very low cetane index, and the diesel fuels resulting from sour crudes, which exhibit excellent low-temperature properties but have the characteristics of exhibiting a high density and a low cetane index.

According to a specific characteristic of the invention, use is made of an amount of hydrogen introduced into the first catalytic region of from 50 to 1000 Normal liters of $H_2$ per liter of feedstock of petroleum origin, preferably from 100 to 500 Normal liters of $H_2$ per liter of petroleum feedstock and more preferably still from 120 to 450 Normal liters of $H_2$ per liter of feedstock of petroleum origin.

The hydrogen coverage in the second catalytic region, according to a specific characteristic of the invention, is from 50 to 2000 Normal liters of $H_2$ per liter of total feedstock (feedstock of biological origin, as a mixture with the effluent resulting from the treatment of the feedstock of petroleum origin), preferably from 150 to 1500 Normal liters of $H_2$ per liter of total feedstock and more preferably still from 200 to 1000 Normal liters of $H_2$ per liter of total feedstock.

According to a specific characteristic of the invention, the temperature of the first catalytic region for treatment of the feedstock of petroleum origin is from 320 to 420° C., preferably from 340 to 400° C. According to another preferred characteristic of the invention, the temperature of the second catalytic region for treatment of the feedstock of biological origin, as a mixture with the effluent resulting from the treatment of the feedstock of petroleum origin, is from 250 to 420° C., preferably from 280 to 350° C.

According to a specific characteristic of the invention, the various feedstocks are treated at a pressure of 25 to 150 bar, preferably of 30 to 70 bar.

According to another characteristic of the invention, the HSV of the feedstock of petroleum origin in the first catalytic region is from 0.3 to 5, preferably from 0.6 to 3.

The HSV in the second catalytic region of the total feedstock (feedstock of biological origin, as a mixture with the effluent resulting from the treatment of the feedstock of petroleum origin) is from 0.5 to 10, preferably from 1 to 5.

Advantageously, according to the invention, the feedstock of petroleum origin is injected into a first catalytic region of the hydrotreating unit and the feedstock of biological origin is injected into a second catalytic region of the hydrotreating unit situated downstream of the first catalytic region.

It is thus possible to use specific catalysts in each catalytic region and to thus promote the hydrodesulphurization or hydrodeoxygenating reactions.

According to a specific characteristic of the invention, the feedstock of biological origin is treated over at least one catalytic bed in the hydrotreating unit, the catalytic bed comprising at least one catalyst based on metal oxides chosen from oxides of metals from Group VI-B (Mo, W, and the like) and VIII-B (Co, Ni, Pt, Pd, Ru, Rh, and the like) supported on a support chosen from alumina, silica/alumina, zeolite, ferrierite, phosphated alumina, phosphated silica/alumina, and the like. Preferably, the catalyst used will be NiMo, CoMo, NiW, PtPd or a mixture of two or more of these. The catalyst used can also be based on metals in the bulk state, such as the commercially known catalyst of Nebula type.

According to another specific characteristic of the invention, the feedstock of biological origin introduced into the hydrotreating unit is treated over at least one catalytic bed at least partially comprising a catalyst with an isomerizing role based on nickel oxides on an acidic support, such as amorphous silica/alumina, zeolite, ferrierite, phosphated alumina, phosphated silica/alumina, and the like.

Catalytic beds comprising NiW oxides exhibit the advantage of promoting isomerization reactions, which can make it possible to improve, that is to say to reduce, the cloud point of the finished product. In particular, in the case of a diesel fuel feedstock comprising a high cloud point, a catalytic bed comprising NiW, and preferably NiW oxides on amorphous silica/alumina, zeolite, ferrierite, phosphated alumina or phosphated silica/alumina, by promoting isomerization reactions, will make it possible to very markedly reduce the cloud point of the finished product.

Catalytic beds comprising catalysts of NiMo oxide type have a high hydrogenating and hydrodeoxygenating power for triglycerides.

Advantageously, the first catalytic region intended for the treatment of the feedstock of petroleum origin comprises one or more catalyst beds comprising catalysts which exhibit a good performance in hydrodesulphurization, while the second catalytic region intended for the treatment of the feedstock of biological origin comprises one or more catalyst beds comprising catalysts exhibiting a good performance for the deoxygenation of the triglycerides of the feedstock (for example based on NiMo) and/or catalysts promoting isomerization reactions. Preferably, in the final bed of the second catalytic region, use will be made of a catalyst with an isomerizing role which makes it possible to improve the low-temperature properties of the product. This catalyst can be composed of nickel oxides on an acidic support, such as amorphous silica/alumina, zeolite, ferrierite, phosphated alumina, phosphated silica/alumina, and the like. Preferably, NiW will be used.

Advantageously, water is injected into the hydrotreating unit in the region for treatment of the feedstock of biological origin. This injection of water makes it possible to shift the equilibrium of the CO shift reaction towards the conversion of CO to $CO_2$, which can be much more easily removed. The conversion to $CO_2$ and $H_2$ of the CO produced by the hydrodeoxygenation reaction is thus promoted, while limiting the methanation reaction which produces methane $CH_4$, which results in a decrease in the exothermicity and in the $H_2$ consumption.

In a particularly advantageous alternative form of the process comprising a treatment of recycle gas resulting from the hydrotreating of the total feedstock before it is reinjected into the hydrotreating unit, an additional treatment is carried out on the carbon monoxide present in the said recycle gas.

It is thus possible not to reinject carbon monoxide into the reactor in order not to risk inhibiting the catalyst.

In particular, such a treatment of the CO can be carried out when the CO content of the recycle gases reaches a predetermined value.

The separation and the treatment of the carbon monoxide can be carried out by the introduction, into the system for treating the recycle gases, of a device for the separation and treatment of carbon monoxide. In particular, it is possible to use CO conversion systems (referred to as CO shift systems by experts in this field), such as those generally supplied by hydrogen unit manufacturers. Thus, preferably, the carbon monoxide is treated by means of a CO conversion unit using the CO shift reaction. The CO is thus converted to $CO_2$, which can be more easily removed.

It is also possible to use a PSA (Pressure Swing Adsorption) treatment unit. This technology is known per se. The adsorbents are selected according to the nature of the impurities to be removed from the hydrogen-carrying streams, which are, in our case, carbon monoxide CO and optionally methane $CH_4$, ethane $C_2H_6$, propane $C_3H_8$, and the like.

Preferably, the gases thus separated are used in a steam reformer, such as a steam methane reformer (SMR). The CO and the other products from the deoxygenation of the feedstock of biological origin are thus enhanced in value as synthesis gas for the production of a hydrogen-comprising gas of biological origin. By using this configuration, the CO is thus enhanced in value and it is thus not necessary, in order to avoid its inhibiting effect, to reduce its concentration in favour of the concentration of $CO_2$ which can be more easily removed.

Advantageously, a treatment is additionally carried out during which the carbon dioxide ($CO_2$) and the hydrogen sulphide ($H_2S$) present in the said recycle gas are separated and treated before the reinjection of the recycle gas into the hydrotreating unit. This treatment is carried out, for example, by passing the recycle gas into an amine absorber. This additional treatment thus makes it possible to remove, from the circuit, the gases to be treated, that is to say $CO_2$ and $H_2S$.

Another particularly advantageous way of using the invention, here also as soon as the level of vegetable oils and/or animal fats is high, is to compensate for the exothermicity which necessarily results from the addition of these oils.

Thus, advantageously, the exothermicity of the hydrotreating of the feedstock is controlled by means of temperature control systems. In a conventional hydrotreating unit, these are, for example, the improvement in the liquid/gas distribution, gas and/or liquid quenches (that is to say, the supply of cold gases or liquids to the reactor), distribution of the catalyst volume over several catalytic beds, preheating control of the feedstock at the inlet of the reactor, in particular by action on the furnace and/or heat exchangers situated upstream of the reactor, on bypass lines, and the like, to lower the temperature at the inlet of the reactor.

According to a first alternative form of the invention, preference will be given to the addition of a liquid (liquid quench) to control the exothermicity.

This liquid can, for example, be composed of a portion of the hydrorefined feedstock exiting from the hydrorefining unit. It is introduced in the region for treating the feedstock of biological origin, in particular when the hydrotreating unit comprises a single reactor.

When the hydrotreating unit comprises two reactors, this liquid can be composed of a portion of the effluent from the first reactor. It is likewise introduced in the region for treatment of the feedstock of biological origin.

According to a second alternative form of the invention in which two separate reactors are used, a temperature control system consists in recovering the heat from the effluent exiting from the first reactor in order to lower its temperature before it is injected into the second reactor. This makes it possible to achieve a significant energy saving.

Advantageously, according to the invention, the hydrotreating unit operates as a single-pass unit, without recycling of liquid effluent at the top of the reactor.

The invention also relates to a hydrorefining unit comprising at least one catalytic hydrotreating unit as described hereafter, for the implementation of the said process.

Advantageously, the catalytic hydrotreating unit comprises at least one reactor provided with a first inlet for the introduction of a feedstock of petroleum origin of diesel fuel type and a second inlet for the introduction of a feedstock of biological origin based on vegetable and/or animal oils, the second inlet being situated downstream of the first inlet.

Advantageously, the catalytic hydrotreating unit comprises a first catalytic region intended for the treatment of the feedstock of petroleum origin and a second catalytic region situated downstream of the first catalytic region and intended for the treatment of the feedstock of biological origin diluted by the feedstock of petroleum origin exiting from the first catalytic region.

In a first embodiment, this catalytic hydrotreating unit comprises a single reactor.

In a second embodiment, the catalytic hydrotreating unit comprises two separate reactors, a first reactor provided with the said first inlet for the introduction of the feedstock of petroleum origin and a second reactor provided with the said second inlet for the introduction of the feedstock of biological origin, the said first reactor additionally comprising an outlet for the treated feedstock of petroleum origin, the said outlet joining the said second inlet of the second reactor.

In a third embodiment, the catalytic hydrotreating unit comprises two separate reactors, a first reactor provided with the said first inlet for the introduction of the feedstock of petroleum origin and with the said second inlet for the introduction of a portion of the feedstock of biological origin based on vegetable and/or animal oils, the second inlet being situated downstream of the first inlet, the said first reactor additionally comprising an outlet for the treated mixture of the two feedstocks, the said outlet joining the inlet of the second reactor, and the second reactor comprises a third inlet for the introduction of a portion of the feedstock of biological origin.

Preferably, the catalytic hydrotreating unit comprises at least one catalytic bed comprising at least one catalyst based on metal oxides chosen from oxides of metals from Group VI-B (Mo, W, and the like) and VIII-B (Co, Ni, Pt, Pd, Ru, Rh, and the like) supported on a support chosen from alumina, silica/alumina, zeolite, ferrierite, phosphated alumina, phosphated silica/alumina, and the like, preferably NiMo, CoMo, NiW, PtPd or a mixture of two or more of these.

Preferably, the catalytic hydrotreating unit comprises at least one catalytic bed at least partially comprising a catalyst with an isomerizing role preferably based on nickel oxides on an acidic support, such as amorphous silica/alumina, zeolite, ferrierite, phosphated alumina, phosphated silica/alumina, and the like.

Preferably, the hydrorefining unit further comprises a separator which separates the liquid and vapour phases of the effluent exiting from the said hydrotreating unit and comprises, downstream of the separator, a unit for separation and treatment of the carbon monoxide (CO) present in the vapour phase of the effluent for the implementation of the process according to the invention.

Preferably, the hydrorefining comprises, downstream of the separator, a unit for separation and treatment of the carbon dioxide ($CO_2$) and hydrogen sulphide ($H_2S$) present in the vapour phase of the effluent for the implementation of the process according to the invention.

The invention is now described with reference to the appended nonlimiting drawings, in which.

Figure 1:
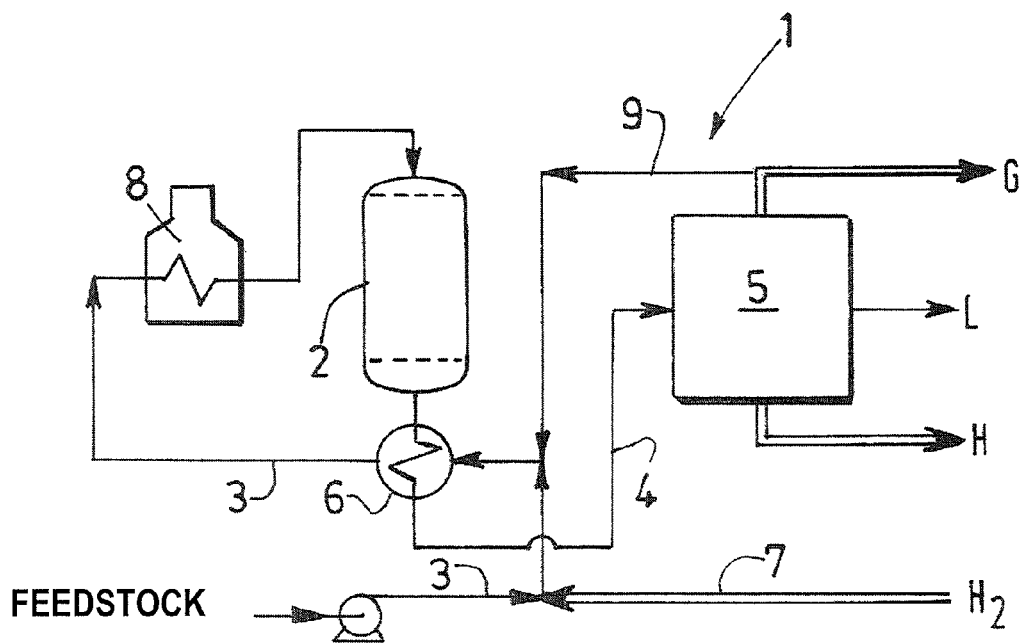
FIG. 1 is a simplified diagram of a unit 1 for the conventional hydrorefining of a feedstock of diesel fuel type.

FIG. 1 represents a simplified diagram of a unit 1 for the conventional hydrorefining of a feedstock of diesel fuel type. This unit 1 comprises a reactor 2 into which the feedstock to be treated is introduced by means of a line 3. This reactor comprises one or more hydrorefining catalyst beds.

A line 4 recovers the effluent at the outlet of the reactor 2 and conveys it to a separation section 5.

A heat exchanger 6 is placed downstream of the reactor on the line 4 in order to heat the feedstock moving in the line 3 upstream of the reactor.

Upstream of this heat exchanger 6, a line 7, connected to the line 3, contributes an $H_2$-rich gas to the feedstock to be treated.

Downstream of the heat exchanger 6 and upstream of the reactor 2, the feedstock mixed with the $H_2$-rich gas moving in the line 3 is heated by a furnace 8.

Thus, the feedstock is mixed with the hydrogen-rich gas and then brought to the reaction temperature by the heat exchanger 6 and the furnace 8 before it enters the reactor 2. It subsequently passes into the reactor 2, in the vapour state if it is a light fraction and as a liquid/vapour mixture if it is a heavy fraction.

At the outlet of the reactor, the mixture obtained is cooled and then separated in the separation section 5, which makes it possible to obtain:
- an $H_2S$-rich sour gas G, a portion of which is reinjected into the $H_2$-rich gas mixed with the feedstock by means of a line 9,
- light products L which result from the decomposition of the impurities. This is because the removal of sulphur, nitrogen, and the like, results in the destruction of numerous molecules and in the production of lighter fractions,
- a hydrorefined product H with a volatility similar to that of the feedstock but with improved characteristics.

Conventionally, the effluent exiting from the reactor 2 is cooled and partially condensed and then enters the separation section 5.

Figure 2:
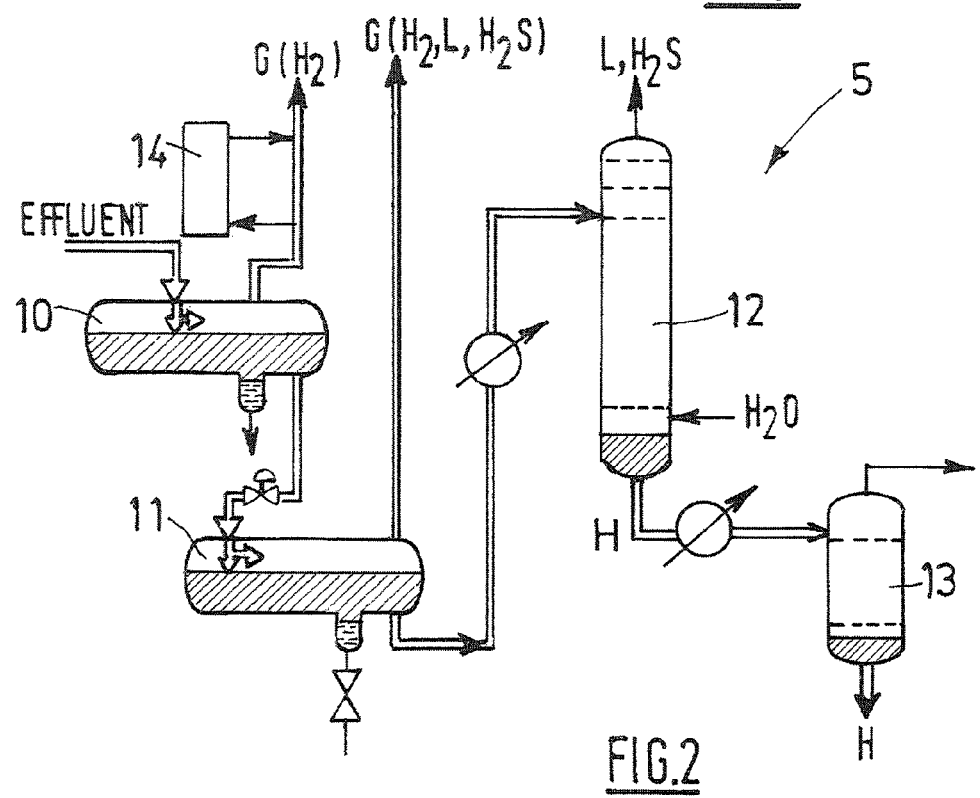
FIG. 2 is a simplified diagram of a separation section of a conventional hydrorefining unit.

Such a separation section 5 generally comprises (FIG. 2):
- a first high-pressure knockout vessel 10 which makes it possible to separate a hydrogen-rich gas $G(H_2)$ from the effluent, it being possible for this gas to be recycled,
- a second low-pressure (10 bar) knockout vessel 11 which separates the liquid and vapour phases obtained by reducing in pressure the liquid originating from the high-pressure knockout vessel 10. The gas $G(H_2, L, H_2S)$ obtained comprises mainly hydrogen, light hydrocarbons and a large part of the hydrogen sulphide formed in the reactor,
- a stripper 12, the role of which is to remove the residual $H_2S$ and light hydrocarbons L from the treated feedstock. The hydrorefined product H is withdrawn at the base of this stripper,
- a dryer 13, which makes it possible to remove the water dissolved by the hot hydrorefined product in the stripper.

Figure 3:
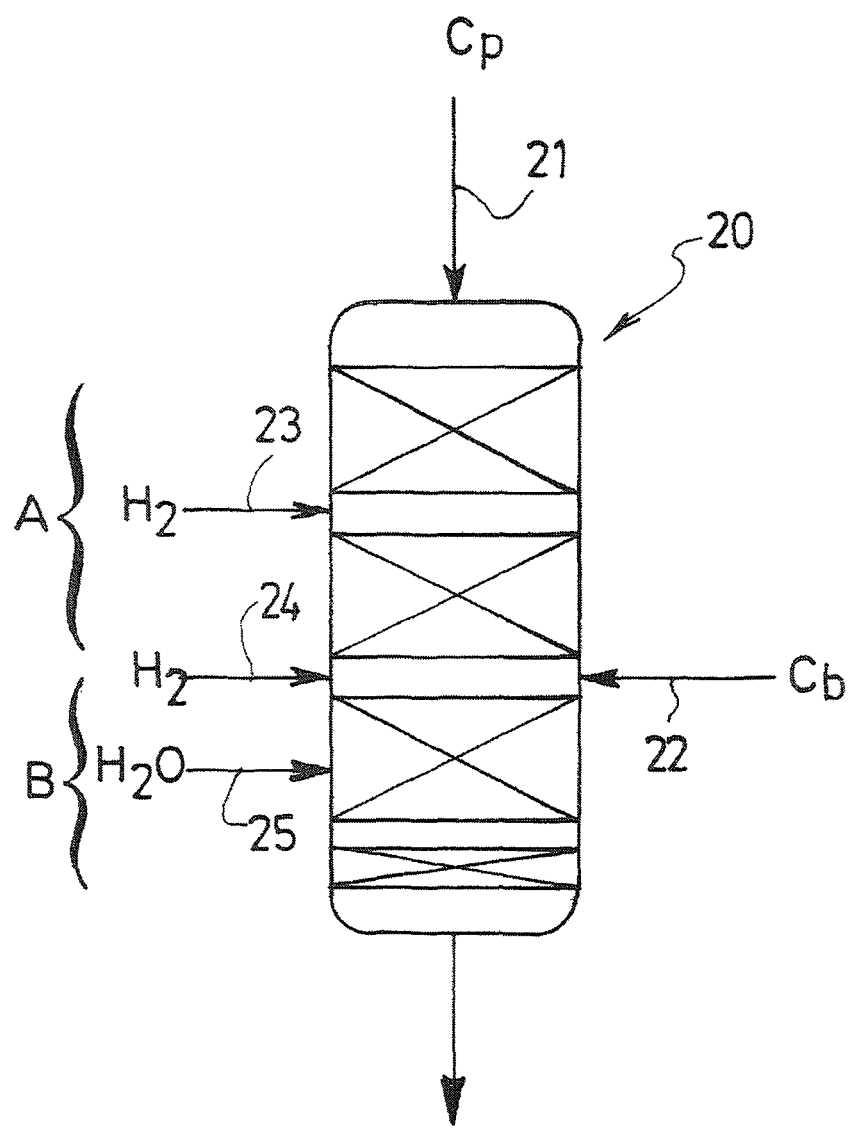
FIG. 3 is a simplified diagram of a hydrotreating unit according to a first embodiment of the invention comprising a single reactor.

According to a first embodiment, a catalytic hydrotreating unit according to the invention is formed of a single reactor 20, as represented in FIG. 3. This reactor 20 is provided with a first inlet 21 for the introduction of a feedstock of petroleum origin (Cp) of diesel fuel type and a second inlet 22 for the introduction of a feedstock of biological origin (Cb) based on vegetable and/or animal oils, the second inlet 22 being situated downstream of the first inlet 21.

Preferably, the inlet 21 for the feedstock of petroleum origin is conventionally situated at the top of the reactor.

The reactor 20 comprises several catalytic beds which are divided into two catalytic regions: a first region situated upstream of the second inlet 22, intended for the treatment of the feedstock of petroleum origin, and a second region B situated downstream of this second inlet 22, intended for the treatment of the feedstock of biological origin.

The first catalytic region A will preferably comprise a catalyst which promotes the hydrodesulphurization of the feedstock of petroleum origin.

The second catalytic region B will preferably comprise a catalyst which promotes the deoxygenation of the feedstock of biological origin. Advantageously, this region B comprises at least one first bed comprising an NiMo-based catalyst and a final bed comprising a catalyst with an isomerizing role which makes it possible to improve the low-temperature properties of the product.

Furthermore, the reactor 20 comprises an inlet 23 for the introduction of hydrogen $H_2$ in the first catalytic region A and preferably a second inlet 24 for introduction of hydrogen $H_2$ in the second catalytic region B, these injections of $H_2$ acting as gaseous quench.

Finally, it is possible to allow an inlet 25 for the introduction of water in the catalytic region B, this injection B making it possible to promote the conversion to $CO_2$ of the CO which may have been formed.

The reactor forming the catalytic hydrotreating unit 20 according to the invention can be used in a conventional hydrorefining unit such as that described with reference to FIG. 1, as replacement for the reactor 2 of this unit.

Figure 4:
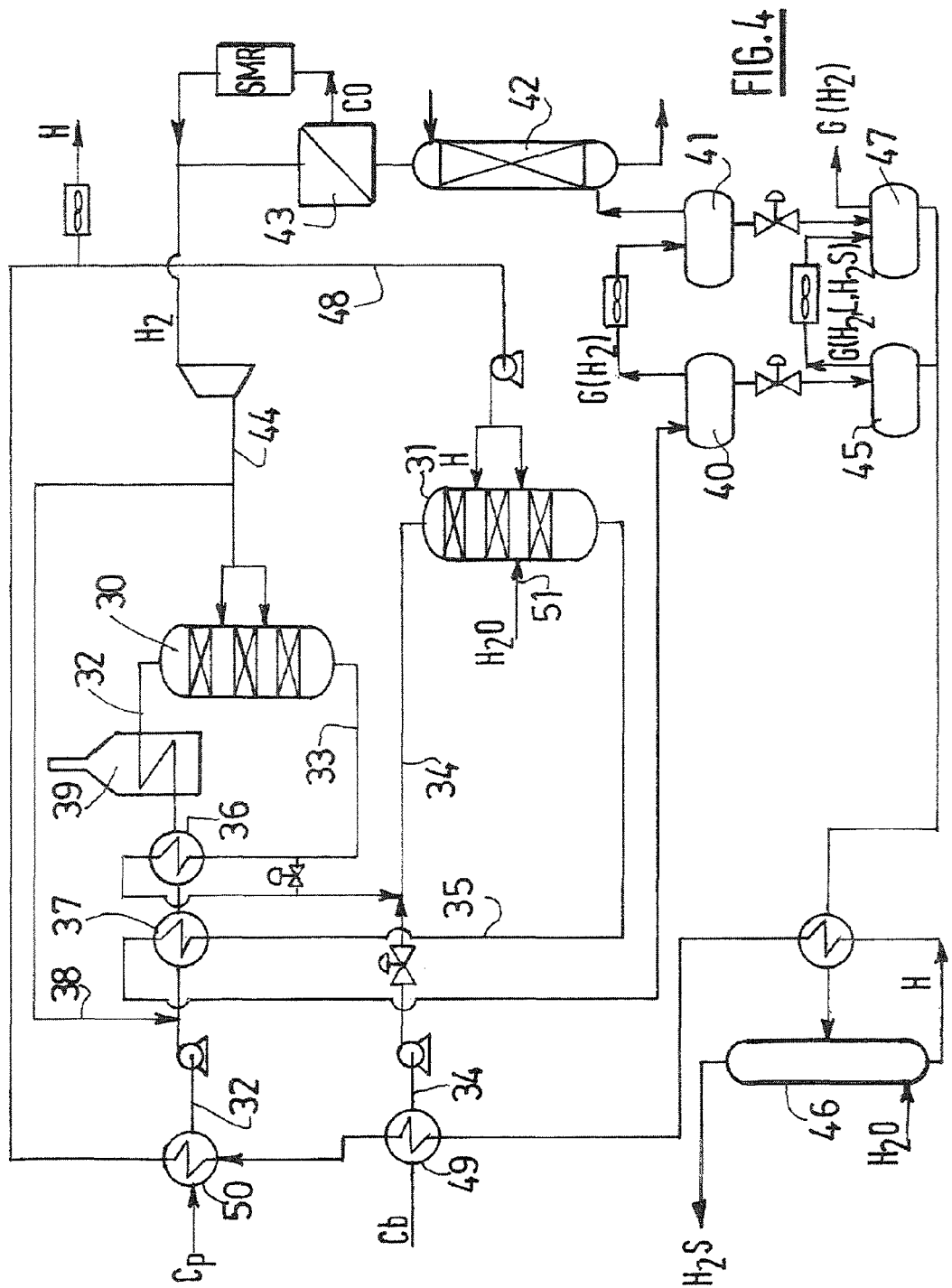
FIG. 4 is a simplified diagram of a hydrorefining unit comprising a hydrotreating unit according to a second embodiment of the invention comprising two reactors.

According to a second embodiment, a catalytic hydrotreating unit according to the invention is formed of two reactors 30, 31. FIG. 4 represents a hydrorefining unit equipped with such a catalytic hydrotreating unit.

The diagram of this hydrorefining unit is very similar to that of the unit represented in FIG. 1.

The first reactor 30 of the catalytic hydrotreating unit according to the invention is preferably identical to the reactor 2 of FIG. 1. The feedstock of petroleum origin Cp is conveyed to the top of this reactor by means of a line 32 but the liquid effluent exiting from this first reactor, instead of being directed to a separation section, is sent to the top of the second reactor 31 by means of a line 33.

A line 34 conveying the feedstock of biological origin Cb joins the line 33 before it enters the top of the second reactor 31.

A line 35 recovers the liquid effluent at the outlet of the second reactor 31 and conveys it to a separation section.

Just as for a conventional unit, a heat exchanger 36 is placed downstream of the first reactor 30 on the line 33 in order to heat the feedstock Cp moving in the line 32 upstream of the first reactor 30.

Preferably, the hydrorefining unit according to the invention additionally comprises a second heat exchanger 37 placed downstream of the second reactor 31 on the line 35 which also heats the feedstock Cp moving upstream of the first reactor 30, this second exchanger 37 being, for example, placed upstream of the first exchanger 36.

Upstream of these heat exchangers 36 and 37, a line 38 connected to the line 32 supplies an $H_2$-rich gas to the feedstock Cp to be treated.

Downstream of the heat exchangers 36, 37 and upstream of the first reactor 30, the feedstock of petroleum origin mixed with the $H_2$-rich gas moving in the line 32 is heated by a furnace 39.

The liquid effluent is cooled at the outlet of the second reactor 31 and then separated in a separation section which comprises a first high-pressure "hot" knockout vessel 40 which makes it possible to separate, from the effluent, a hydrogen-rich gas $G(H_2)$ also comprising CO and $CO_2$. This gas $G(H_2)$ is conveyed to another low-pressure "cold" knockout vessel 41, then conveyed to a unit 42 for the treatment and separation of $CO_2$, for example an amine absorber, and then to a unit 43 for the separation and treatment of CO of the PSA type. The CO separated in this unit 43, as well as the other gases separated, such as $CH_4$, $C_2H_6$, $C_3H_8$, and the like, can advantageously be sent to an SMR unit for the production of hydrogen $H_2$. This hydrogen can then optionally be returned in the line 44 bringing back the recycle gas to the first reactor 30 as gaseous quench and in the line 38 for the treatment of the feedstock Cp.

The liquid effluent exiting from the first knockout vessel 40 is, for its part, directed to another low-pressure (10 bar) knockout vessel 45 which separates the liquid and vapour phases obtained by reducing in pressure the liquid originating from the high-pressure knockout vessel 40. The gas G(H₂ L, H₂S) obtained comprises mainly hydrogen, light hydrocarbons and a large part of the hydrogen sulphide formed in the reactor. The liquid effluent resulting from this knockout vessel 45 is conveyed to a steam stripper 46, the role of which is to remove the residual H₂S and light hydrocarbons from the treated feedstock. The gaseous effluent exiting from the knockout vessel 45 can be sent to another knockout vessel 47 fed with the liquid effluent exiting from the knockout vessel 41, the liquid effluent of which is also conveyed to the stripper 46. The gas exiting from this knockout vessel 47 can be made use of.

The hydrorefined product H is withdrawn at the base of this stripper 46.

The separation unit described above and composed of the knockout vessels 40, 41, 45 and 47, of the stripper 46 and of the treatment units 42, 43 can, of course, be used at the outlet of the single reactor described in FIG. 3. Depending on the conditions, it is also possible to allow only two successive knockout vessels 40 and 41, the liquid effluents of which are directed directly to the stripper 46.

A portion of the hydrorefined product H can be introduced into the second reactor via a line 48 in order to act as liquid quench. Heat exchangers 49, 50, respectively placed on the lines 34 and 32, can be used for the preheating of the feedstock of biological origin and of the feedstock of petroleum origin respectively.

Just as in the preceding embodiment with one reactor, it is possible to allow for injection of water 51 into the second reactor 31.

This unit thus makes it possible to carry out the hydrorefining of petroleum fractions in the first reactor 30 and to finish the hydrorefining of the petroleum fractions in the second reactor 31, and also to deoxygenate the triglycerides of the feedstock of biological origin.

In addition, it is clearly apparent that the second reactor can be easily isolated from the circuit by means of valves, a bypass line directly conveying the liquid effluent exiting from the first reactor to the separation and treatment devices. Thus, this hydrorefining unit can be used for the hydrotreating of a feedstock of petroleum origin, with or without addition of a feedstock of biological origin.

The following examples illustrate the advantages produced by the process according to the invention.

Examples

Feedstock Studied

The feedstock based on diesel fuel studied is composed of 30% of LCO (Light Cycle Oil) and of 70% of fractions of diesel fuel type originating from the straight-run (SR) distillation of a crude oil. The characteristics of this diesel fuel feedstock and those of the palm oil incorporated at approximately 15% by weight are listed in Tables 1 and 2 respectively.

TABLE 1

Characteristics of the diesel fuel feedstock

| | |
|---|---|
| Density at 15° C. | 0.8685 |
| Sulphur content (ppm) | 6570 |
| Including refractory sulphur (dibenzothiophene or heavier compounds) (% by weight) | 80% |
| Basic nitrogen content (ppm) | 23 |
| Cloud point (° C.) | −4 |
| Calculated cetane index (ASTM D 4737) | 47 |
| Distillation temperature of | |
| 5% | 240 |
| 20% | 259 |
| 50% | 285 |
| 80% | 319 |
| 95% | 344 |
| of the diesel fuel (° C., ASTM D 86) | |
| Content of polyaromatics (% by weight) | 14.8 |
| Total content of aromatics (% by weight) | 31.6 |

TABLE 2

Characteristics of the palm oil

| | | |
|---|---|---|
| Density at 15° C. | | 0.8956 |
| Acid composition (percentages by weight) | | |
| Laurie acid | 12:0 | 0.2 |
| Myristic acid | 14:0 | 1.1 |
| Palmitic acid | 16:0 | 45.7 |
| Palmitoleic acid | 16:1 | 0.2 |
| Margaric acid | 17:0 | 0.1 |
| | 17:1 | <0.1 |
| Stearic acid | 18:0 | 4.3 |
| Oleic acid | 18:1 | 37.7 |
| Linoleic acid | 18:2 | 9.8 |
| Linolenic acid | 18:3 | 0.2 |
| Arachidic acid | 20:0 | 0.4 |
| Gondoic acid | 20:1 | 0.1 |
| GC: | | |
| Free fatty acids | | 0.7 |
| Monoglycerides | | <0.1 |
| Diglycerides | | 7.1 |
| Triglycerides | | 92.0 |
| Not identified | | 0.2 |
| Content of elements (ppm) | | |
| Phosphorus | | 0.5 |
| Calcium | | <0.2 |
| Copper | | <0.08 |
| Iron | | 0.04 |
| Magnesium | | <0.02 |
| Sodium | | <0.1 |

Plant and Operational Conditions

In Example 1, which acts as reference, the treatment is carried out on a unit comprising a single hydrotreating reactor in which the catalyst volume is 54.6 m³. Simultaneous feeding of palm oil and of the feedstock based on diesel fuel is carried out at the top of the reactor. The hydrogen partial pressure is 63 bar and the mean treatment temperature is 362° C. This temperature makes it possible to ensure a sulphur content of 10 ppm starting from the feedstock treated here.

In Example 2 according to the invention, the treatment is carried out on a unit comprising two hydrotreating reactors. The feedstock based on diesel fuel is incorporated at the top of the first reactor and the feedstock based on palm oil is incorporated in the effluent from the first reactor, before entering the second reactor. The overall catalytic volume in the unit is 54.6 m³ (identical to that of Example 1). The mean reaction temperature of the second reactor is 321° C. and that of the first reactor is such that the unit (combination of the two reactors in series) makes it possible to ensure a sulphur content of 10 ppm starting from the feedstock treated here.

In Example 3 according to the invention, the treatment is also carried out on a unit comprising two hydrotreating reactors. The feedstock based on diesel fuel is incorporated at the top of the first reactor and the feedstock based on palm oil is incorporated in the effluent from the first reactor, before entering the second reactor. The overall catalytic volume is 47.4 m$^3$. The mean reaction temperature in the first reactor is 362° C. (identical to that of Example 1) and that of the second reactor is 321° C., which makes it possible for the unit (combination of the two reactors in series) to ensure a sulphur content of 10 ppm starting from the feedstock treated here.

The reactors comprise a commercial hydrodesulphurization catalyst known to a person skilled in the art composed of porous alumina on which nickel and molybdenum oxides are deposited. This catalyst is provided in the form of extrudates with a diameter of 1 to 2 mm and a trilobe shape. The loading density is 950 kg/m$^3$ of catalyst charged to the unit.

The hydrogen partial pressure at the inlet of the first reactor is 63 bar. The hydrogen coverage used in the first reactor for the examples shown is 350 Nl/l (that is to say, the amount of Normal liters of hydrogen per liter of feedstock).

A section for stripping the liquid effluent is present at the outlet of the reactor in order to remove the gasses, such as $H_2S$, $NH_3$, CO or $CO_2$, when these compounds are present in the effluent.

The operating conditions of the unit used are summarized in Table 3.

TABLE 3

Operating conditions for obtaining a diesel fuel comprising 10 ppm of sulphur

|  | Example 1 | Example 2 | Example 3 |
|---|---|---|---|
| Throughput of the diesel fuel feedstock (m$^3$/h) | 47.7 | 47.7 | 47.7 |
| Throughput of the palm oil feedstock (m$^3$/h) | 6.9 | 6.9 | 6.9 |
| Reactor 1 |  |  |  |
| Catalyst volume (m$^3$) | 54.6 | 36.6 | 29.4 |
| Mean reaction temperature (° C.) | 362 | 357 | 362 |
| HSV (h$^{-1}$) | 1 | 1.31 | 1.62 |
| Hydrogen coverage (Nl/l) | 350 | 350 | 350 |
| Sulphur content of the effluent | 10 | 25 | 25 |
| Reactor 2 |  |  |  |
| Catalyst volume (m$^3$) |  | 18 | 18 |
| Mean reaction temperature (° C.) |  | 321 | 321 |
| Hydrogen coverage (Nl/l) |  | 300 | 300 |
| HSV (h$^{-1}$) |  | 3 | 3 |
| Sulphur content of the effluent |  | 10 | 10 |
| Total volume of catalyst in the unit | 54.6 | 54.6 | 47.4 |

The comparison of Examples 1 and 2 shows that, using the same catalyst volume (54.6 m$^3$), the use of the invention makes it possible to operate the first reactor at a temperature of 357° C. instead of 362° C. in the case of Example 1. This difference of 5° C. has the consequence of producing a considerable energy saving, all the more so as a portion of the heat is recovered from the effluent from the first reactor. Moreover, as the conditions are less severe, the cycle time is found to be extended thereby. In this case, it is possible to expect to have a cycle time extended by at least 5 months. Furthermore, the second reactor in Example 2 will be characterized by a very long cycle time due to the relatively low operating temperature, which is nevertheless sufficient to produce a 10 ppm diesel fuel at the outlet.

The comparison of Examples 1 and 3 shows that, at a same mean reaction temperature for the first reactor, the volume of catalyst necessary in order to obtain a 10 ppm diesel fuel at the outlet is lower when the invention is employed. This is because the saving with regard to the first catalytic region is 7.2 m$^3$ of catalyst volume, which implies a fall of 13% in the total catalyst volume for the unit. Furthermore, the second reactor in Example 2 will be characterized by a very long cycle time due to the relatively low operating temperature, which is nevertheless sufficient to produce a 10 ppm diesel fuel at the outlet.

Production of CO, $CO_2$, $CH_4$ and $H_2O$

The production, at the outlet of the unit, of the gases CO, $CO_2$, $CH_4$ and $H_2O$, with respect to the palm oil feedstock studied, is illustrated in Table 4.

TABLE 4

Production, at the outlet of the unit, of CO, $CO_2$, $CH_4$ and $H_2O$, with respect to the palm oil feedstock studied

|  | Example 1 | | Examples 2 and 3 | |
|---|---|---|---|---|
|  | mol % | weight % | mol % | weight % |
| CO | 1.1 | 3.7 | 2.2 | 7.6 |
| $CO_2$ | 1.2 | 6.3 | 1.1 | 5.8 |
| $CH_4$ | 1.0 | 1.9 | 0.5 | 0.9 |
| $H_2O$ | 2.4 | 5.1 | 1.5 | 3.1 |

Table 4 demonstrates that the use of the invention exhibits the advantage of a reduction in the hydrogen $H_2$ consumption. This is because the formation of methane ($CH_4$) and of water ($H_2O$) is reduced.

Quality of the Products

The results of a detailed analysis of the effluent obtained for Examples 2 and 3 are combined in Table 5. The incorporation of palm oil as feedstock of a hydrodesulphurization unit, both by simultaneous incorporation at the top of the reactor and by use of the invention, has the consequence of adding normal paraffins to the final product, and the characteristics of the products obtained are found to be favourably affected thereby. In particular, it is found that the cloud point of the effluents is −3° C., whereas, with the incorporation of 15% of palm oil in the diesel fuel feedstock, a greater impact on the cloud point might have been expected.

TABLE 5

Characteristics of the effluents from Examples 2 and 3

| Density at 15° C. | 0.8436 |
|---|---|
| Sulphur (ppm) | 10 |
| Cloud point (° C.) | −3 |
| CFPP (° C.) | −8 |
| Calculated cetane index | 59 |
| GC (triglycerides) (% by weight) | <0.05 |
| Distillation temperature (° C., ASTM D86) |  |
| 5% (% of distilled product) | 236 |
| 20% | 262 |
| 50% | 288 |
| 80% | 315 |
| 95% | 343 |
| Content of polyaromatics (% by weight) | 6.2 |

The invention claimed is:

1. A process for the catalytic hydrotreating of a feedstock of petroleum origin of diesel fuel type and of a feedstock of biological origin based on vegetable oils and/or animal fats in a stationary bed hydrotreating unit, comprising the step of:
   introducing the feedstock of petroleum origin into the hydrotreating unit upstream of the feedstock of biological origin such that a hydrodeoxygenation of the feedstock of biological origin takes place downstream of a hydrodesulfurization of the feedstock of petroleum origin, and the level of the feedstock of biological origin based on vegetable oils and/or animal fats is up to 30% by weight.

2. The process according to claim 1, in which the step of introducing comprises the steps of:
   injecting the feedstock of petroleum origin into a first catalytic region of the hydrotreating unit; and
   injecting the feedstock of biological origin into a second catalytic region of the hydrotreating unit situated downstream of the first catalytic region.

3. The process according to claim 1, in which the step of introducing comprises the steps of:
   injecting the feedstock of petroleum origin into a single reactor of the hydrotreating unit; and
   injecting the feedstock of biological origin into the single reactor downstream of the feedstock of the petroleum origin.

4. The process according to claim 1, in which the step of introducing comprises the steps of:
   injecting the feedstock of petroleum origin into a first reactor of the hydrotreating unit; and
   injecting a mixture of the feedstock of biological origin and liquid effluent exiting from the first reactor into a second reactor of the hydrotreating unit.

5. The process according to claim 1, in which the step of introducing comprises the steps of:
   injecting the feedstock of petroleum origin into a first reactor of the hydrotreating unit;
   injecting a first part of the feedstock of biological origin into the first reactor of the hydrotreating unit; and
   injecting a second part of the feedstock of biological origin and liquid effluent exiting from the first reactor into a second reactor of the hydrotreating unit.

6. The process according to claim 1, 2, 3, 4 or 5, in which the space velocity (HSV) of the feedstock of petroleum origin is less than the space velocity of the feedstock of biological origin, as a mixture with the effluent resulting from the treatment of the feedstock of petroleum origin.

7. The process according to claim 1, in which the feedstock of petroleum origin of diesel fuel type is chosen from the group consisting of
   i) diesel fuel fractions originating from a distillation of a crude oil and/or of a synthetic crude resulting from the treatment of oil shales of heavy and extraheavy crude oils, or of the effluent from a Fischer-Tropsch process, and
   ii) diesel fuel fractions resulting from a conversion process, in which the conversion process is catalytic and/or thermal cracking.

8. The process according to claim 1, in which the level of the feedstock of biological origin is less than or equal to 15% by weight.

9. The process according to claim 1, in which the vegetable oils present in the feedstock of biological origin are chosen from the group consisting of palm oil, soybean oil, rapeseed oil, sunflower oil, linseed oil, rice bran oil, maize oil, olive oil, castor oil, sesame oil, pine oil, peanut oil, palm kernel oil, coconut oil, babasu oil, and a mixture of two or more of these oils.

10. The process according to claim 2, in which the catalytic region for the injection of the feedstock of biological origin comprises a first metal trap catalytic bed.

11. The process according to claim 2, further comprising:
    introducing hydrogen into the first catalytic region, in which the amount of hydrogen introduced into the first catalytic region is from 50 to 1000 Normal liters of $H_2$ per liter of the feedstock of petroleum origin.

12. The process according to claim 2, further comprising:
    introducing hydrogen into the second catalytic region, in which the amount of hydrogen introduced into the second catalytic region is from 50 to 2000 Normal liters of $H_2$ per liter of total feedstock, and the total feedstock is the feedstock of biological origin, as a mixture with the effluent resulting from the treatment of the feedstock of petroleum origin.

13. The process according to claim 2, in which the temperature of the first catalytic region for treatment of the feedstock of petroleum origin is from 320 to 420° C.

14. The process according to claim 2, in which the temperature of the second catalytic region for treatment of the feedstock of biological origin, as a mixture with the effluent resulting from the treatment of the feedstock of petroleum origin, is from 250 to 420° C.

15. The process according to claim 1, in which the feedstocks are treated at a pressure of 25 to 150 bar.

16. The process according to claim 2, in which the HSV of the feedstock of petroleum origin in the first catalytic region is from 0.3 to 5.

17. The process according to claim 2, in which the HSV in the second catalytic region of total feedstock is from 0.5 to 10, and the total feedstock is the feedstock of biological origin, as a mixture with effluent resulting from the treatment of the feedstock of petroleum origin.

18. The process according to claim 1, further comprising:
    passing the feedstock of biological origin through at least one catalytic bed in the hydrotreating unit,
    in which the catalytic bed comprises a catalyst based on metal oxides chosen from the group consisting of oxides of metals from Groups VI-B and VIII-B supported on a support chosen from the group consisting of alumina, silica/alumina, zeolite, ferrierite, phosphated alumina, phosphated silica/alumina, and a mixture of two or more of these.

19. The process according to claim 1, in which the feedstock of biological origin introduced into the hydrotreating unit is treated over at least one catalytic bed at least partially comprising a catalyst with an isomerizing role on an acidic support.

20. The process according to claim 1, further comprising:
    injecting water in the region for treatment of the feedstock of biological origin.

21. The process according to claim 1, further comprising:
    treating recycle gas resulting from the hydrotreating of total feedstock before it is reinjected into the hydrotreating unit; and
    separating and treating the carbon monoxide (CO) present in the recycle gas before the recycle gas is reinjected into the hydrotreating unit.

22. The process according to claim 21, in which the step of separating and treating CO is carried out by means of a CO conversion unit using the CO shift reaction.

23. The process according to claim 21, in which the step of separating and treating CO is carried out by means of a Pressure Swing Adsorption (PSA) treatment unit.

24. The process according to claim 2, further comprising:
using the separated CO in a steam methane reformer (SMR).

25. The process according to claim 1, further comprising:
treating recycle gas resulting from the hydrotreating of total feedstock before it is reinjected into the hydrotreating unit,
separating and treating the carbon dioxide ($CO_2$) and the hydrogen sulphide ($H_2S$) present in the recycle gas before the recycle gas is reinjected into the hydrotreating unit.

26. The process according to claim 1, in which the exothermicity of the hydrotreating of the feedstock of biological origin is controlled by means of temperature control systems.

27. The process according to claim 26, further comprising:
adding a liquid in the region of treatment of the feedstock of biological origin.

28. The process according to claim 27, further comprising:
injecting the feedstock of petroleum origin into a first reactor of the hydrotreating unit;
recovering heat from effluent exiting from the first reactor;
lowering the temperature of the effluent before it is injected into a second reactor of the hydrotreating unit; and
injecting the feedstock of biological origin and the effluent exiting from the first reactor into the second reactor of the hydrotreating unit.

29. The process claim 1, in which the hydrotreating unit operates as a single-pass unit, without recycling of liquid effluent at the top of the hydrotreating unit.

30. The process according to claim 7, in which the conversion process is Fluidized Catalytic Cracking (FCC), coking, or visbreaking.

31. The process according to claim 9, in which one of the vegetable oils is palm oil.

32. The process according to claim 11, in which the amount of hydrogen introduced into the first catalytic region is from 100 to 500 Normal liters of $H_2$ per liter of the feedstock of petroleum origin.

33. The process according to claim 11, in which the amount of hydrogen introduced into the first catalytic region is from 120 to 450 Normal liters of $H_2$ per liter of the feedstock of petroleum origin.

34. The process according to claim 12, in which the amount of hydrogen introduced into the second catalytic region is from 150 to 1500 Normal liters of $H_2$ per liter of the total feedstock.

35. The process according to claim 12, in which the amount of hydrogen introduced into the second catalytic region is from 200 to 1000 Normal liters of $H_2$ per liter of the total feedstock.

36. The process according to claim 13, in which the temperature of the first catalytic region for treatment of the feedstock of petroleum origin is from 340 to 400° C.

37. The process according to claim 14, in which the temperature of the second catalytic region for treatment of the feedstock of biological origin, as a mixture with the effluent resulting from the treatment of the feedstock of petroleum origin, is from 280 to 350° C.

38. The process according to claim 15, in which the feedstocks are treated at a pressure of 30 to 70 bar.

39. The process according to claim 16, in which the HSV of the feedstock of petroleum origin in the first catalytic region is from 0.6 to 3.

40. The process according to claim 17, in which the HSV of the total feedback in the second catalytic region is from 1 to 5.

41. The process according to claim 18, in which the metal oxides are chosen from the group consisting of oxides of metals from Mo, W, Co, Ni, Pt, Pd, Ru, Rh and mixtures of two or more of these.

42. The process according to claim 18, in which the metal oxides are chosen from the group consisting of NiMo, CoMo, NiW, PtPd and mixtures of two or more of these.

43. The process according to claim 19, in which the catalyst is based on nickel oxides, and the acidic support is chosen from the group consisting of amorphous silica/alumina, zeolite, ferrierite, phosphated alumina, and phosphated silica/alumina.

44. The process according to claim 23, further comprising:
separating and treating at least one of methane ($CH_4$), ethane ($C_2H_6$), and propane ($C_3H_8$) gases present in the recycle gas by means of a PSA treatment unit before the recycle gas is reinjected into the hydrotreating unit.

45. The process according to claim 43, further comprising:
using the separated methane ($CH_4$), ethane ($C_2H_6$), or propane ($C_3H_8$) gas in a SMR.

46. The process according to claim 27, further comprising:
injecting the feedstock of petroleum origin into a first reactor of the hydrotreating unit;
injecting a first part of the feedstock of biological origin into the first reactor of the hydrotreating unit;
recovering heat from effluent exiting from the first reactor;
lowering the temperature of the effluent before it is injected into a second reactor of the hydrotreating unit; and
injecting a second part of the feedstock of biological origin and the effluent exiting from the first reactor into the second reactor of the hydrotreating unit.

* * * * *